(12) United States Patent
Kuehnert et al.

(10) Patent No.: US 11,278,387 B2
(45) Date of Patent: Mar. 22, 2022

(54) OCCLUSION CONTROL SYSTEM AND METHOD FOR OCCLUSION CONTROL

(71) Applicant: IMAGE INSTRUMENTS GMBH, Chemnitz (DE)

(72) Inventors: Tom Kuehnert, Chemnitz (DE); Rolf Kuehnert, Chemnitz (DE)

(73) Assignee: Image Instruments GmbH, Chemnitz (DE)

(*) Notice: Subject to any disclaimer, the term of this patent is extended or adjusted under 35 U.S.C. 154(b) by 33 days.

(21) Appl. No.: 16/976,130

(22) PCT Filed: Jan. 22, 2020

(86) PCT No.: PCT/IB2020/050491
§ 371 (c)(1),
(2) Date: Aug. 27, 2020

(87) PCT Pub. No.: WO2020/170050
PCT Pub. Date: Aug. 27, 2020

(65) Prior Publication Data
US 2020/0405465 A1    Dec. 31, 2020

(30) Foreign Application Priority Data
Feb. 21, 2019  (DE) ............ 10 2019 104 382.4

(51) Int. Cl.
*A61C 11/00* (2006.01)
*A61C 11/08* (2006.01)
(Continued)

(52) U.S. Cl.
CPC ............ *A61C 19/05* (2013.01); *A61C 11/006* (2013.01); *A61C 19/045* (2013.01)

(58) Field of Classification Search
CPC ...... A61C 19/05; A61C 11/006; A61C 19/045; A61C 1/00; A61C 1/003; A61C 7/002; A61C 7/00; A61C 9/0046; A61B 5/4542
(Continued)

(56) References Cited

U.S. PATENT DOCUMENTS 4,330,276 A   5/1982  Becker et al.
4,468,198 A   8/1984  Kataoka et al.
(Continued)

FOREIGN PATENT DOCUMENTS

DE         4038572 A1    6/1992
DE    102010018825 A1   11/2011
(Continued)

*Primary Examiner* — Jacqueline T Johanas
*Assistant Examiner* — Madison E Bondoc
(74) *Attorney, Agent, or Firm* — Laurence A. Greenberg; Werner H. Stemer; Ralph E. Locher

(57) ABSTRACT

An occlusion control system and a corresponding method for occlusion control, in which dimensional data of a digital upper and lower jaw model are stored on a data processing and control device, an upper jaw representative model and a lower jaw representative model are manually moved relative to one another in an adjustment plane, position changes of the upper jaw representative model and the lower jaw representative model are detected. An associated relative position between the upper and lower jaw models is calculated. If, in this relative position, there is a dental arch penetration and/or a dental arch decoupling from the upper and lower jaw model, a length of at least one of at least three spacer elements between the upper jaw representative model and the lower jaw representative model is adjusted, which brings about a haptically detectable change in the representative model.

10 Claims, 1 Drawing Sheet

(51) Int. Cl.
*A61C 19/05* (2006.01)
*A61C 19/045* (2006.01)

(58) Field of Classification Search
USPC .......................................................... 433/68
See application file for complete search history.

(56) References Cited

U.S. PATENT DOCUMENTS

| | | | |
|---|---|---|---|
| 5,743,732 A | 4/1998 | Watson | |
| 6,616,449 B1 * | 9/2003 | Rocher | A61C 11/02 433/55 |
| 8,021,149 B2 | 9/2011 | Gutman et al. | |
| 2018/0055420 A1 * | 3/2018 | Gassler | A61B 5/1111 |

FOREIGN PATENT DOCUMENTS

| | | | | |
|---|---|---|---|---|
| DE | 102017217558 A1 * | 4/2019 | | A61C 7/36 |
| EP | 0025201 A1 | 3/1981 | | |
| EP | 2742906 A1 * | 6/2014 | | A61C 13/00 |
| WO | WO-2016021619 A1 * | 2/2016 | | A61C 11/00 |
| WO | WO-2016120342 A1 * | 8/2016 | | A61C 11/006 |

* cited by examiner

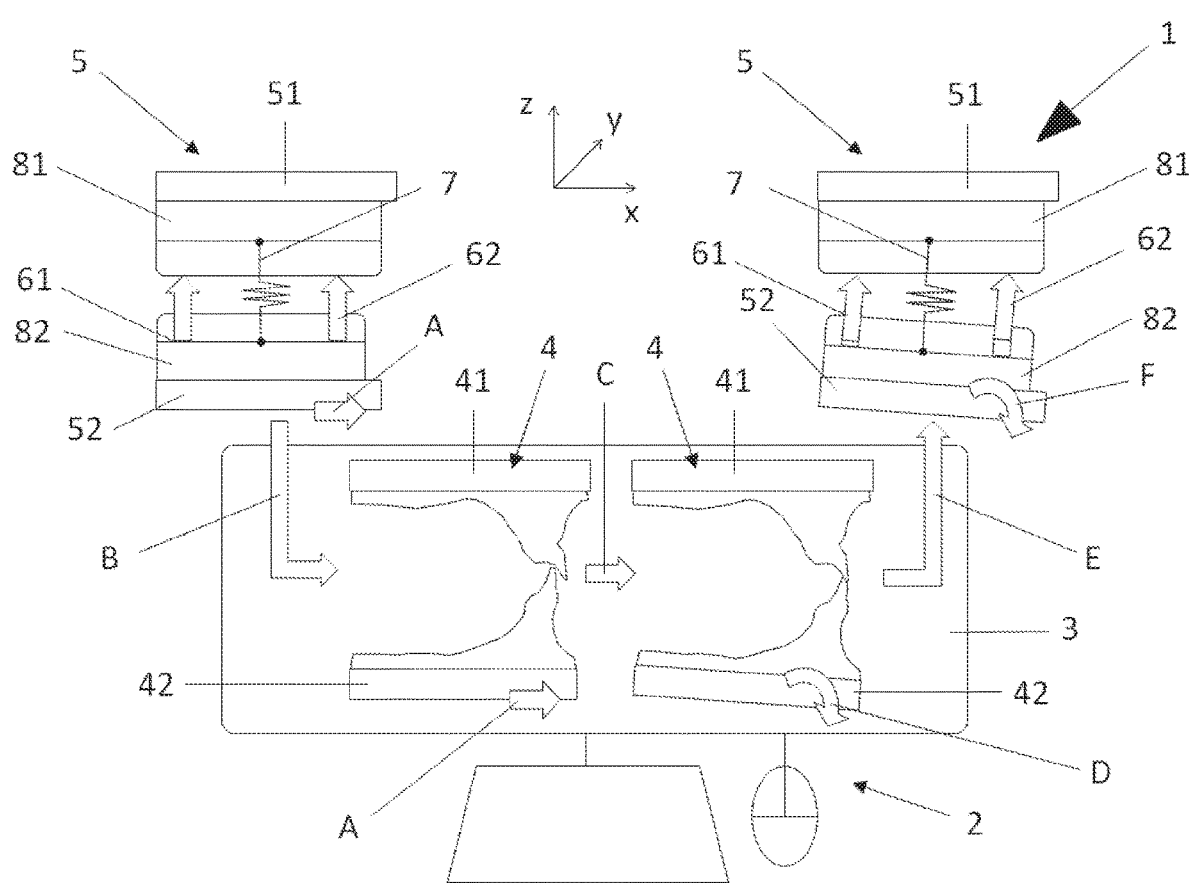

OCCLUSION CONTROL SYSTEM AND METHOD FOR OCCLUSION CONTROL

BACKGROUND OF THE INVENTION

Field of the Invention

The present invention relates to an occlusion control system and to a method for occlusion control.

Dental models play an important role in dentistry/dental medicine, since they represent the tooth condition and the mutual jaw position and thus the occlusion, i.e. the contact between the teeth of the upper jaw and the lower jaw, in a geometrically correct manner, and thus can be used for a diagnostic assessment as well as for treatment planning purposes.

In combination with articulators, which are devices with which a temporomandibular joint movement can be mechanically simulated, or axiography systems that serve to electronically measure a jaw movement, dental models can also be used for dynamic measurements and planning.

Dental models are traditionally based on taking dental impressions on a patient, e.g. using an impression tray in an impression compound made of silicone or another hardenable material, then pouring the hardened dental impression with plaster or plastic, and then trimming and carving in a dental laboratory.

With the availability of sophisticated solutions for model and intraoral scanners, physical dental models are increasingly being digitized or digitally created from the start by scanning in the patient's mouth. One generally speaks of digital or virtual models.

The use of digital models in connection with suitable software applications instead of physical models offers a number of advantages in diagnostics, planning and advice. In addition to savings in material and preparation expenses, simplification in the creation of digital work models and improvements in the accuracy of the jaw reproduction, planning activities including the production of treatment apparatuses and auxiliary means can be implemented much more effectively, and novel techniques can be used in principle.

There are only a few disadvantages to these advantages with regard to the use of digital or virtual instead of physical models. One of these disadvantages is the haptic information from the mutual displacement of the physical upper jaw model relative to the lower jaw model, which is no longer available when using virtual models, from which a practitioner has previously been able to derive feedback information for assessing the occlusion.

As an alternative, representations of the occlusion, such as, for example, color-coded representations, are used for digital models. However, this does not offer an equivalent replacement for the haptic feedback known to the practitioner.

EP 0 025 201 A1 contains a method and an apparatus for reproducing jaw movements, auxiliary devices being attached in the mouth of a patient to the lower jaw and upper jaw, which record measurement data in the case of relative movements between the upper and lower jaw. A movable part of an articulator carrying a jaw model is guided in accordance with the recorded measurement data. Electrical distance measuring devices are arranged in the patient's mouth, measure the distances between defined points on the upper jaw and lower jaw during jaw movement and output them to a memory. The movable part of the articulator is controlled in accordance with the stored data in such a way that it reproduces the recorded movement sequence, the combinations of the measured distances between the defined points of the lower jaw and upper jaw being set again in the same way as in the measuring process.

An apparatus and a method for positioning a real lower jaw model and an upper jaw model for producing a splint or prosthesis for correcting the condylar position of a temporomandibular joint are known from the publication DE 10 2010 018 825 B4. A lower jaw model of a patient's jaw is arranged on a position-changing platform of a positioning device; an upper jaw model of the patient is arranged on a holder of the positioning device. The positioning device is controlled by a control/evaluation device. An evaluation program generates a virtual first lower jaw model and a virtual second lower jaw model and moves the virtual lower jaw models relative to one another until a therapeutically favorable target position is given between the virtual upper jaw model and the virtual second lower jaw model. On the basis of this relative position between the virtual second lower jaw model and the virtual upper jaw model, the movement of the positioning device is controlled by the control/evaluation device.

DE 40 38 572 A1 describes an apparatus for reproducing the movement of the lower jaw in dental technology. The apparatus has a plurality of servomotors which freely guide a lower jaw model in three dimensions in accordance with the movements measured on the patient. The servomotors are connected to the lower jaw support plate by means of rods, the attachment points of the rods being formed by joints and the joint points being in the geometrical arrangement which was also chosen for the measuring points when the patient was registered.

An apparatus for replicating and analyzing the movement of a lower jaw with respect to an upper jaw with tooth models thereof is disclosed in U.S. Pat. No. 8,021,149 B2. The apparatus includes a base frame, an arm connected to the base frame, and a suspension arrangement that is positionable by a plurality of electromechanical actuators. The arm connects to the base frame and carries the tooth model of the upper jaw in a fixed position to the base frame. The suspension arrangement having opposite first and second sides carries the tooth model of the lower jaw in working relationship to the tooth model of the upper jaw. The actuators each selectively transmit movement to the sides of the suspension arrangement such that the movement of the lower jaw obtained during a recording process can be replicated in real time on the apparatus.

U.S. Pat. No. 5,743,732 A proposes an apparatus for creating a model of the physiological dynamics of a jaw. The apparatus comprises a jaw model having a lower jaw and an upper jaw; a loading mechanism coupled to the jaw model for applying an occlusal force to the lower jaw and the upper jaw; one or more mechanisms coupled to the lower jaw of the jaw model for moving the lower jaw with respect to the upper jaw; and a load or force measuring apparatus for detecting occlusal forces on the lower jaw and the upper jaw of the jaw model. The lower jaw is moved laterally and protruding by means of electric motors. A strain gauge can be coupled to the load handling apparatus to measure and display the forces sensed by the sensing apparatus. A digital processor can also be used to store and record the forces measured by the strain gauge.

An apparatus for reproducing lower jaw movements is described in U.S. Pat. No. 4,468,198 A.

A carrier plate for lower jaw models, on which a lower jaw model is attached, is regarded as a rigid plane. Three points contained in this rigid plane are selected and marked.

Three reference points are set for the reproduction in each case in accordance with one of the marked points and in a predetermined dimensional relationship thereto. Connecting means enable the respective reference points to be freely rotated and bent for reproduction. Sliding guide means enable the respective connecting means to slide freely in one of the orthogonal three-dimensional directions X, Y, Z. The respective joint means are driven in one of the directions by means of drive means. The resulting movements of the reference points are synthesized for reproduction in order to subject the rigid plate, which forms the carrier plate of the lower jaw model, to a three-dimensional movement.

SUMMARY OF THE INVENTION

It is therefore the object of the present invention to provide an occlusion system and a method for occlusion control in which, despite the use of a virtual dental model, a haptic feedback for occlusion is generated analogously to the perception on the physical dental model.

This object is achieved on the one hand by means of an occlusion control system, which has a data processing and control device on which dimensional data of a digital dental model having an upper jaw model and a lower jaw model are stored, a physical representative model coupled to the data processing and control device by at least one data and/or signal transmission medium, having an upper jaw representative model and a lower jaw representative model mechanically coupled therewith, which can be moved manually in translation and rotation relative to one another in an adjustment plane, and at least one detection device coupled to the data processing and control device, with which position changes of the upper jaw representative model and the lower jaw representative model can be detected, wherein, between the upper jaw representative model and the lower jaw representative model by the control of the data processing and control device in dependence of a relative position calculated by the data processing and control device from the position changes of the upper jaw representative model and the lower jaw representative model, at least three spacer elements that define the adjustment plane and via which the upper jaw representative model and the lower jaw representative model are in surface contact with one another are provided, said spacer elements being adjustable in length between the upper jaw model and the lower jaw model and changing a relative distance between the upper jaw representative model and the lower jaw representative model through this length adjustment.

The occlusion control system according to the invention combines the advantages of digital dental systems for occlusion control with the haptic feeling conveyed to a user by a physical dental model, from which he recognizes that, for example, a further relative movement between the upper and lower jaw model is no longer possible or the upper and lower jaw model are not suitably in contact with each other.

On the data processing and control device of the occlusion control system according to the invention, dimensional data of the patient's upper and lower jaw which were scanned in a patient's mouth can advantageously be stored, converted into a digital upper jaw model and lower jaw model, and processed computationally.

In addition, the occlusion control system according to the invention has a physical representative model. The physical representative model has an upper jaw representative model and a lower jaw representative model mechanically coupled therewith. The upper jaw representative model as well as the lower jaw representative model are not comparable to a physical upper jaw and lower jaw model as are known from the prior art. For example, neither the upper jaw nor the lower jaw representative model has dental arches and/or dimensions corresponding to a real upper and lower jaw. On the representative model, however, the upper jaw representative model can be manually displaced relative to the lower jaw representative model, similarly to how a user of physical dental models is familiar. With the representative model, manual movement is only possible in one adjustment plane.

The representative model, which can also be called a mockup, is an abstract physical realization or illustration of a dental model consisting of an upper and lower dental arch in occlusion. The representative model interacts both as an input and as an output device for the data processing and control device and the memory and programs executed thereon.

A detection device is also provided on the representative model, by means of which a manually changed relative position of the upper jaw representative model to the lower jaw representative model is recorded and transmitted to the data processing and control device. This implements the changed relative position into the digital dental model in real time. The data processing and control device calculates the respective occlusion on the digital upper and lower jaw model. Here, the data processing and control device determines, for example, whether there is one or more penetration(s) and/or a decoupling of the upper and lower jaw model. Decoupling means that the upper jaw model is in contact with the lower jaw model at less than three points. The data processing and control device then generates at least one signal and sends this to the representative model.

The spacer elements temporarily determine the distance and/or the relative position between the upper jaw representative model and the lower jaw representative model. Moving and/or rotating the upper jaw representative model and/or the lower jaw representative model in a plane defined by the current position of the spacer elements is possible.

On the basis of the respective signal sent by the data processing and control device to the representative model, if at least one penetration or decoupling is determined by computer technology, the length of at least one of the spacer elements is changed on the digital dental model to such an extent that the respective penetration or decoupling is eliminated.

The change in length of at least one of the spacer elements results in a change in the inclination between the upper jaw representative model and the lower jaw representative model. This change in the orientation of the upper jaw representative model relative to the lower jaw representative model is comparable to a haptic reaction caused on a physical dental model with an identical relative movement of the partial jaw.

The change in length of at least one of the spacer elements changes at least one distance between the upper jaw representative model and the lower jaw representative model, which is sensed in a haptic manner by the user of the occlusion control system. As a result of this haptic feedback, the user immediately learns that, for example, specific further movements of the upper jaw representative model and/or lower jaw representative model are not possible on the representative model.

It is thus possible in the occlusion control system according to the invention to haptically detect or sense an occlusion position between the only digitally present upper jaw model and lower jaw model on the representative model by shifting the upper jaw representative model and the lower jaw representative model against each other.

The occlusion control system according to the invention is a device for simulating a haptic reaction from a relative displacement of virtual upper and lower dental arches contained in the upper jaw model and the lower jaw model in occlusion by using the representative model. The haptic reaction with regard to the qualitative assessment of the occlusion is comparable to the haptic reaction on a correspondingly moving physical dental model.

In an advantageous embodiment of the present invention, the occlusion control system also has an indicator device coupled to the data processing and control device, on which the upper jaw model and the lower jaw model and their relative position depending on relative movements of the upper jaw representative model and the lower jaw representative model can be displayed. With the help of the indicator device, such as a screen, the upper jaw model and the lower jaw model can be graphically displayed, for example. For example, special colors can be used to graphically display penetrations and decoupling between the upper jaw model and lower jaw model. As a result, in addition to the haptic information from the representative model, the user also receives visual information about the existing occlusion. As an alternative or in addition to the visual occlusion indicator, the indicator device can also provide an acoustic occlusion indicator. For example, specific sounds can be output by the indicator device when there is penetration.

In embodiments of the present invention, the spacer elements are either permanently connected on one side to the upper jaw representative model and slidably provided on the lower jaw representative model, or are permanently connected on one side to the lower jaw representative model and slidably provided on the upper jaw representative model, or an intermediate plate is provided between the upper jaw representative model and the lower jaw representative model having the spacer elements fixed therein or thereon and from one side of which the spacer elements can be changed in length in the direction of the upper jaw representative model and on the other side of which the spacer elements can be changed in length in the direction of the lower jaw representative model.

It has proven to be advantageous if the detection device has at least one control body mechanically coupled to the upper jaw representative model and/or the lower jaw representative model which converts the thrust and/or torsional forces exerted on the upper jaw representative model and/or the lower jaw representative model into signals for the data processing and control device. The detection device can function, for example, like a 3D mouse, two 2D mice, or a joystick. The detection device can thus detect the relative movement between the upper jaw representative model and the lower jaw representative model and transmit it in real time to the data processing and control device.

Length-adjustable actuators, servomotors, piezo elements, and/or moving coils, such as so-called voice coils, are particularly suitable as spacer elements in the present invention.

In a preferred embodiment of the occlusion control system according to the invention, the upper jaw representative model is coupled to the lower jaw representative model by at least one spring or pressure element. As a result, a permanent mechanical contact between the upper jaw representative model and the lower jaw representative model can be realized.

In a variant of the invention, the occlusion system has cooling for the spacer elements. Cooling can be advantageous, for example, if voice coils or piezo elements are used as spacer elements. For example, the spacer elements can be provided in a cooled housing. This enables the spacer elements to work with high precision.

The upper jaw representative model and/or the lower jaw representative model(s) is/are preferably half-shell(s) or plate(s) adapted to a typical size of the palm grip surface of an adult. The representative model is correspondingly easy to handle.

The object is further achieved by a method for occlusion control, wherein dimensional data of a digital dental model having an upper jaw model and a lower jaw model are stored on a data processing and control device, on a physical representative model having an upper jaw representative model and a lower jaw representative model mechanically coupled therewith, the upper jaw representative model and the lower jaw representative model are manually movable relative to one another in a translatory and/or rotary manner in an adjustment plane, position changes of the upper jaw representative model and the lower jaw representative model are detected by a detection device and transmitted to the data processing and control device, the data processing and control device calculates an associated relative position between the upper jaw model and the lower jaw model from these position changes, and if, in this relative position, there is at least one dental arch penetration and/or at least one dental arch decoupling from the upper jaw model and the lower jaw model, at least one signal is transmitted to the representative model, by means of which the length of at least one of at least three spacer elements provided between the upper jaw representative model and the lower jaw representative model, which define the adjustment plane between the upper jaw representative model and the lower jaw representative model, is adjusted in length, whereby a haptically detectable change in the relative position between the upper jaw representative model and the lower jaw representative model is brought about in the representative model.

The method according to the invention makes possible a haptic assessment of an occlusion on the virtual dental model by means of the representative model.

In the method according to the invention, a relative movement between the upper jaw representative model and the lower jaw representative model is effected manually on the representative model. This relative movement is detected by the detection device and transferred to the data processing and control device in the form of at least one signal. By means of the data processing and control device, a correction movement of the virtual upper jaw and the virtual lower jaw model, which may be necessary for a presupposed occlusal contact, is then calculated and returned via an interface of the data processing and control device to the spacer elements of the representative model in order to force a correction of the representative model.

In a preferred embodiment of the method according to the invention, the upper jaw model and the lower jaw model as well as their relative position depending on relative movements of the upper jaw representative model and the lower jaw representative model are displayed relative to one another with an indicator device coupled to the data processing and control device. The visualization possible with the indicator device is a direct graphical representation of the position of the upper jaw model relative to the lower jaw model, which supports the user.

A special development of the method according to the invention provides that a correction movement of the upper jaw model and/or of the lower jaw model calculated for a presupposed occlusal contact between the upper jaw model and the lower jaw model and returned via an interface of the data processing and control device to the spacer elements of the representative model is proportionally enlarged compared to a length adjustment required in a physical dental model having real jaw dimensions. If the data processing and control device calculates at least one dental arch penetration and/or at least one dental arch decoupling from the upper jaw model and the lower jaw model, the length or deflection of the at least one spacer element is changed more than would be the case with a real dental model. The calculated correction deflection of the jaw models with respect to one another is thus increased by a factor X>1 at the support points of the representative model in order to increase the differential change in the position of the plane and thus to reinforce the reaction, for example, of a handle of the representative model on a hand of a user, i.e. the haptic reaction. The effectiveness of the method according to the invention can be improved further by increasing the haptic reaction to the user.

The present invention is explained in more detail below with reference to a drawing FIGURE.

BRIEF DESCRIPTION OF THE DRAWING

The sole FIGURE of the drawing schematically illustrates the basic structure of an embodiment of an occlusion control system according to the invention and the mode of operation thereof.

DETAILED DESCRIPTION OF THE INVENTION

The FIGURE schematically shows the basic structure of an embodiment of an occlusion control system 1 according to the invention.

The occlusion control system 1 has a data processing and control device 2 having an indicator device 3. In the exemplary embodiment shown, the data processing and control device 2 is a computer, but can also be a laptop or a smartphone. In the exemplary embodiment shown, the indicator device 3 is a screen, but can alternatively or additionally have a sound output unit, such as a loudspeaker.

The occlusion control system 1 also has a physical representative model 5, which is shown in the FIGURE at the top left in an initial position and at the top right in an end position. The shown start and end positions are only examples and can also have a different inclination and different distances between the parts of the representative model 5.

The representative model 5 has a physical upper jaw representative model 51 and a physical lower jaw representative model 52 located opposite the upper jaw representative model 51. The upper jaw representative model 51 is mechanically connected to the lower jaw representative model 52 via a spring element 7 in the exemplary embodiment shown, however, in other embodiments of the invention it can be connected in other ways, for example by means of hydraulic, and/or pneumatic, and/or electromagnetic force.

The upper jaw representative model 51 and the lower jaw representative model 52 are simple plates in the exemplary embodiment shown, but can also be simple half-shells. In the exemplary embodiment shown, the upper jaw representative model 51 and the lower jaw representative model 52 each have a size adapted to a palm grip surface of an adult, wherein a "palm" is meant to be fingers curved around each model 51 or 52, so that the models can be grasped or twisted with one hand and be displaced relative to one another. In other embodiments of the present invention, it is generally sufficient if either the upper jaw representative model or the lower jaw representative model can be gripped by the user. This is possible, for example, in table-top versions of the representative model, in which displacement and reaction are mediated only with one hand.

Between the upper jaw representative model 51 and the lower jaw representative model 52, three spacer elements which are adjustable in length are provided, only two spacer elements 61, 62 thereof being visible in the view shown. In principle, in other embodiments of the present invention, more than three spacer elements can also be used. The spacer elements 61, 62 are designed in the form of a pin in the embodiment shown, but may also have a different shape in other embodiments of the invention, for example in the form of a cone or pyramid.

The upper jaw representative model 51 and the lower jaw representative model 52 are in surface contact with one another via the spacer elements, which form a three-point support here. The surface contact is ensured by forces in the direction of the three-point support. In the exemplary embodiment shown, this force is generated by means of the spring element 7.

The spacer elements define an adjustment plane in which the upper jaw representative model 51 can be moved relative to the lower jaw representative model 52. This mobility includes two translational degrees of freedom, in the exemplary embodiment in the x and y directions, and a rotational degree of freedom, that is, a rotatability in the adjustment plane.

The spacer elements 61, 62 are active adjustment elements and can be controlled with the data processing and control device. Each of the spacer elements 61, 62 can be controlled separately. The three spacer elements 61, 62 are length-adjustable actuators in particular.

The upper jaw representative model 51 can be moved relative to the lower jaw representative model 52 both in translation and in rotation in the adjustment plane. The construction of the three-point support allows a manual displacement of the upper jaw representative model 51 and/or the lower jaw representative model 52 in the adjustment plane formed and thus defined by the support surface of the three spacer elements, while maintaining the surface contact.

In the exemplary embodiment shown, the spacer elements 61, 62 are fixedly connected to the lower jaw representative model 52 and the upper jaw representative model 51 can slide on the contact surfaces of the spacer elements 61, 62 symbolized by the arrowheads of the spacer elements 61, 62. In other embodiments of the present invention, it can also be the other way round, so that the spacer elements 61, 62 are fastened to the upper jaw representative model 51 and the lower jaw representative model 52 slides on correspondingly provided contact surfaces of the spacer elements. In other, not shown embodiments of the present invention, an intermediate plate can also be provided between the upper jaw representative model 51 and the lower jaw representative model 52, on or in which the spacer elements are fastened and from which they protrude in both directions, i.e. towards the upper jaw representative model 51 as well the lower jaw representative model 52.

In the exemplary embodiment shown, the lower jaw representative model 52, as represented schematically by arrow A, is displaced relative to the upper jaw representative model 51, for example in the x direction.

The initial position, as well as the relative displacement between the upper jaw representative model 51 and the lower jaw representative model 52, is detected by a detection device 81, 82, which is only indicated schematically here, and, as is shown schematically by the arrow B, is transmitted in the form of corresponding signals to the data processing and control device 2. For this purpose, the data processing and control device 2 has a corresponding input interface.

In the exemplary embodiment shown here, the detection device 81, 82 has two spherical control bodies, by means of which thrust and/or torsional forces, which are exerted on the upper jaw representative model 51 and/or the lower jaw representative model 52, are converted into signals for the data processing and control device 2. Specifically, the detection device 81, 82 can be designed like an optical or mechanical 3D mouse or a joystick.

Dimensional data of an upper jaw and lower jaw previously scanned in a patient's mouth are stored in the data processing and control device 2, from which the data processing and control device 2 creates a digital dental model 4 having a digital upper jaw model 41 and a digital lower jaw model 42, which in the exemplary embodiment shown are graphically represented on the indicator device 3.

The relative displacement between the upper jaw representative model 51 and the lower jaw representative model 52 carried out on the representative model 5 takes place digitally by means of a corresponding program, which is executed on the data processing and control device 2, on the dental model 4, as is shown schematically by the arrow A'. The program transfers the relative movement measured on the representative model to the virtual representation of the upper jaw and lower jaw, i.e. to the virtual upper jaw model 41 and the virtual lower jaw model 42, on the specific digital dental model 4 to be evaluated in occlusion.

In the example shown, this leads to the fact that the upper jaw 41 penetrates the lower jaw 41, which is not physically feasible. From this, the data processing and control device 2 calculates a correction in a calculation step indicated by the arrow C, which in the exemplary embodiment shown results in a change in the inclination of the lower jaw model 42, as shown by the arrow D. The data processing and control device 2 thus calculates the associated deflection of the upper jaw model and the lower jaw model, which is forced by the occlusal contact of the virtual upper jaw and lower jaw dental arch to avoid penetrations or decoupling, for the predetermined relation of the virtual jaw objects.

The inclination and position of the adjustment plane thus enforced is transmitted from the respective program to the representative model 5 via an output interface of the data processing and control device 2. In the exemplary embodiment shown here, at least one control signal is calculated from the inclination calculated by the program and, as shown schematically by the arrow E, this is transmitted to the representative model 5. The control signal is used to control at least one of the three spacer elements 61, 62 of the representative model 5. The length setting of the spacer elements 61, 62 designed as linear actuators is changed.

In the exemplary embodiment shown, the lengths of the spacer elements 61, 62 are changed differently, as a result of which the lower jaw representative model 52 tilts forward and downward relative to the upper jaw representative model 51. The mechanical coupling between the upper jaw representative model 51 and the lower jaw representative model 52 is retained due to the spring element 7.

The change in length of the spacer elements 61, 62 changes the inclination of the three-point support and thus the mutual relation of the upper jaw representative model 51 and the lower jaw representative model 52.

The relative movement between the upper jaw representative model 51 and the lower jaw representative model 52 can be grasped directly by the user, who is holding at least one of the two models in his hands. The mechanical reaction caused on the hand or hands of the user correlates with the haptic reaction on a correspondingly moving physical dental model and simulates it.

By modulating the input and output signals, an optimization of the haptic perception effect can be achieved for the purpose of better assessment of the occlusal relation.

The invention claimed is:

1. An occlusion control system, comprising:
   a data processing and control device having stored thereon dimensional data of a digital dental model including an upper jaw model and a lower jaw model;
   a physical representative model coupled to said data processing and control device by way of at least one data and/or signal transmission medium, said physical representative model having an upper jaw representative model and a lower jaw representative model mechanically connected to one another and configured to be manually moved in translation and rotation relative to one another in an adjustment plane;
   at least one detection device coupled to said data processing and control device and configured to detect position changes of said upper jaw representative model and said lower jaw representative model;
   at least three spacer elements disposed between said upper jaw representative model and said lower jaw representative model, and defining the adjustment plane between said upper jaw representative model and said lower jaw representative model;
   wherein said at least three spacer elements are adjustable in length by control of said data processing and control device in dependence on a relative position calculated by said data processing and control device from position changes of the upper jaw model and the lower jaw model, and wherein a length adjustment of said at least three spacer elements adjusts a relative position of the upper jaw representative model and said lower jaw representative model.

2. The occlusion control system according to claim 1, further comprising: an indicator device coupled to said data processing and control device and configured to display thereon the upper jaw model and the lower jaw model and a relative position thereof in dependence on relative movements of said upper jaw representative model and said lower jaw representative model.

3. The occlusion control system according to claim 1, wherein:
   said spacer elements are permanently connected on one side to said upper jaw representative model and are slidable on said lower jaw representative model; or
   said spacer elements are permanently connected on one side to said lower jaw representative model and are slidable on said upper jaw representative model; or
   an intermediate plate is disposed between said upper jaw representative model and said lower jaw representative model, said intermediate plate having said spacer elements affixed thereto and having a side from which said spacer elements can be changed in length in a direction of said upper jaw representative model and on an opposite side on which said spacer elements can be changed in length in a direction of said lower jaw representative model.

4. The occlusion control system according to claim 1, wherein said detection device has at least one control body mechanically coupled to said upper jaw representative model and/or said lower jaw representative model, said control body being configured to enable thrust and/or torsional forces exerted on said upper jaw representative model and/or on said lower jaw representative model to be converted into signals for said data processing and control device.

5. The occlusion control system according to claim 1, wherein said spacer elements are selected from the group consisting of length-adjustable actuators, servomotors, piezo elements, and oscillator coils.

6. The occlusion control system according to claim 1, wherein said upper jaw representative model is coupled to said lower jaw representative model by at least one spring or pressure element.

7. The occlusion control system according to claim 1, wherein one or both of said upper jaw representative model or said lower jaw representative model is a half-shell or a plate adapted to a typical size of a palm grip surface of an adult.

8. A method for occlusion control, the method comprising:
storing dimensional data of a digital dental model having an upper jaw model and a lower jaw model on a data processing and control device;
providing a physical representative model having an upper jaw representative model and a lower jaw representative model mechanically coupled therewith, and manually moving the upper jaw representative model and the lower jaw representative model relative to one another in translation and/or rotation in an adjustment plane;
detecting position changes of the upper jaw representative model and the lower jaw representative model by a detection device and transmitting the position changes to the data processing and control device;
calculating with the data processing and control device an associated relative position between the upper jaw model and the lower jaw model from the position changes, and if, in the relative position, there is at least one dental arch penetration and/or at least one dental arch decoupling from the upper jaw model and the lower jaw model, transmitting at least one signal to the representative model to cause a length of at least one of at least three spacer elements, provided between the upper jaw representative model and the lower jaw representative model, which define the adjustment plane between the upper jaw representative model and the lower jaw representative model, to be adjusted, and to thereby bring about a haptically detectable change in the relative position between the upper jaw representative model and the lower jaw representative model of the representative model.

9. The method according to claim 8, which further comprises displaying on a display device coupled to the data processing and control device, the upper jaw model and the lower jaw model and the relative position thereof depending on relative movements of the upper jaw representative model and the lower jaw representative model.

10. The method according to claim 8, which comprises calculating a correction movement of the upper jaw model and/or of the lower jaw model for a presupposed occlusal contact between the upper jaw model and the lower jaw model and supplying the correction movement via an interface of the data processing and control device to the spacer elements of the representative model and proportionally enlarging the correction movement compared to a length adjustment required in a physical dental model having real jaw dimensions.

* * * * *